H. F. ENGELLAND.
CORN HARVESTING MACHINE.
APPLICATION FILED MAY 27, 1910.

981,400.

Patented Jan. 10, 1911.

3 SHEETS—SHEET 1.

Witnesses
E. Larson
Charles Wilson

Inventor
Henry F. Engelland
By Peel & Robb
Attorneys

H. F. ENGELLAND.
CORN HARVESTING MACHINE.
APPLICATION FILED MAY 27, 1910.

981,400.

Patented Jan. 10, 1911.
3 SHEETS—SHEET 2.

Witnesses
E. Larson
Charles Albilson

Inventor
Henry F. Engelland
By Peeler & Robb
Attorneys

H. F. ENGELLAND.
CORN HARVESTING MACHINE.
APPLICATION FILED MAY 27, 1910.

981,400.

Patented Jan. 10, 1911.
3 SHEETS—SHEET 3.

Witnesses
E. Larson
Charles A. Wilson

Inventor
Henry F. Engelland
ByДелах Робб
Attorneys

UNITED STATES PATENT OFFICE.

HENRY FRED ENGELLAND, OF MISHICOTT, WISCONSIN.

CORN-HARVESTING MACHINE.

981,400.

Specification of Letters Patent. Patented Jan. 10, 1911.

Application filed May 27, 1910. Serial No. 563,799.

*To all whom it may concern:*

Be it known that I, HENRY F. ENGELLAND, a citizen of the United States, residing at Mishicott, in the county of Manitowoc and State of Wisconsin, have invented certain new and useful Improvements in Corn-Harvesting Machines, of which the following is a specification.

This invention relates to improvements in corn harvesters and is designed particularly as an improvement on Patent No. 934511, granted to me September 21, 1909.

The present invention resides in the provision of certain substantial operating mechanisms which greatly improve, simplify, and increase the practical value of my former invention.

With the above and other objects in view, this invention consists in the construction, combination, and arrangement of parts, all as hereinafter more fully described, claimed, and illustrated in the accompanying drawings, wherein—

Figures 1, 2:
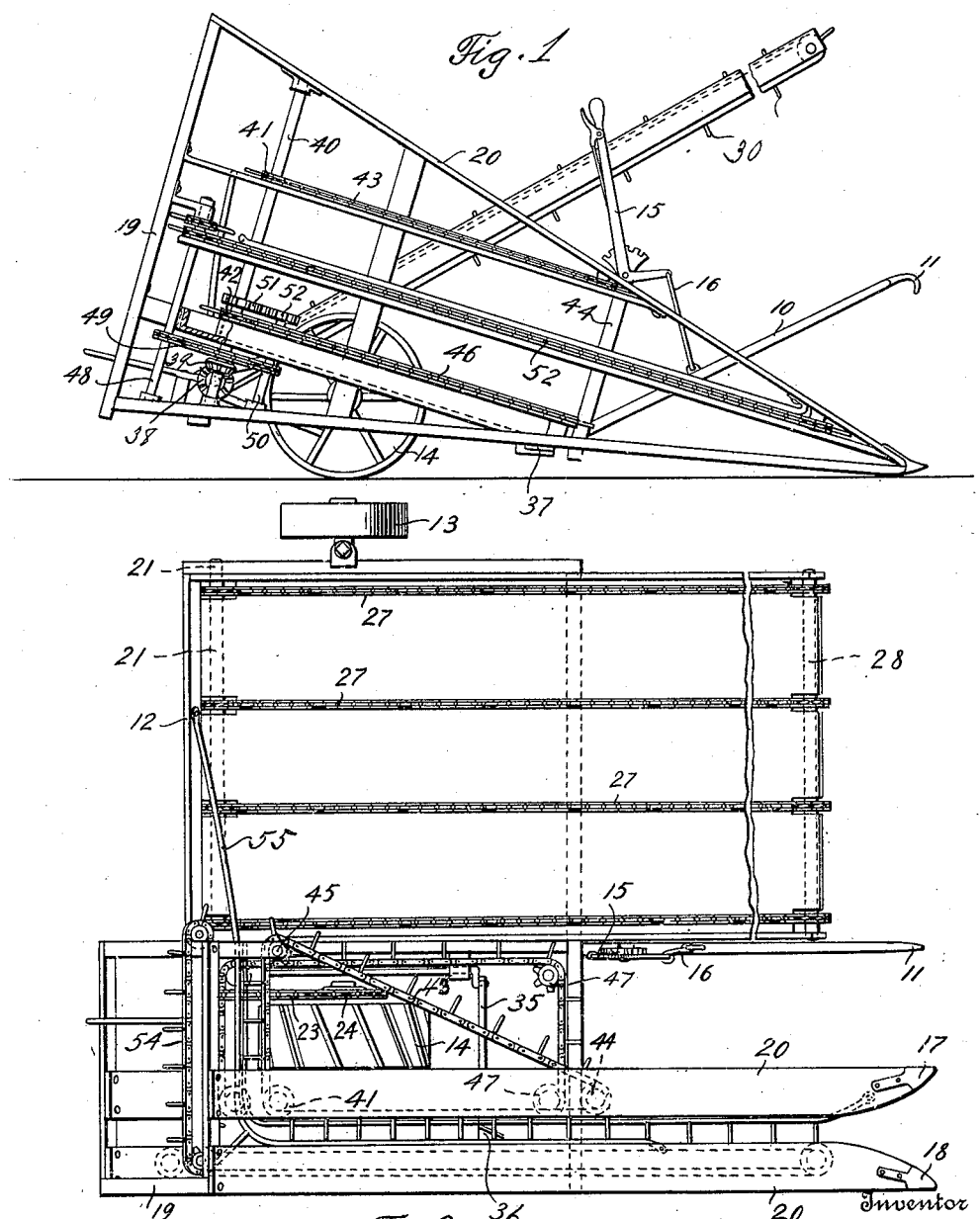
Figure 3:
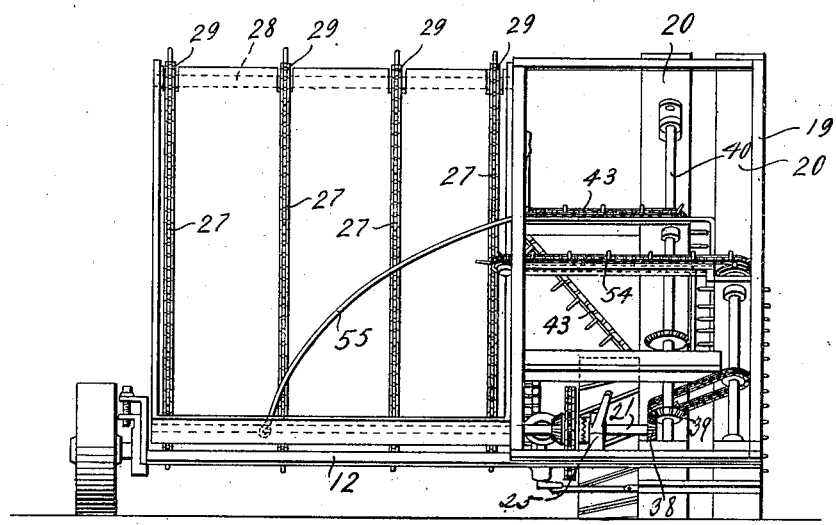
Figure 4:
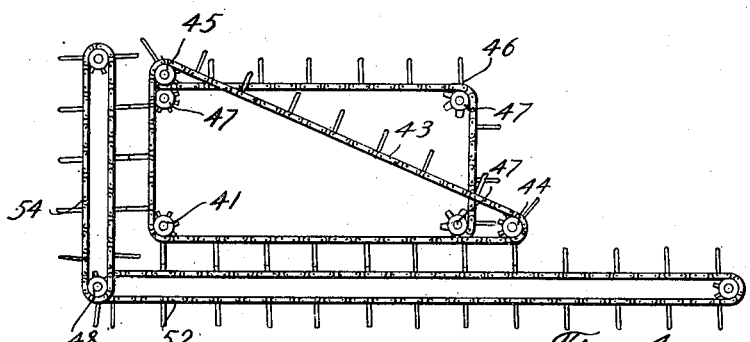
Figure 6:
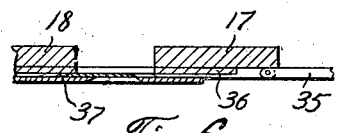
Figure 5:
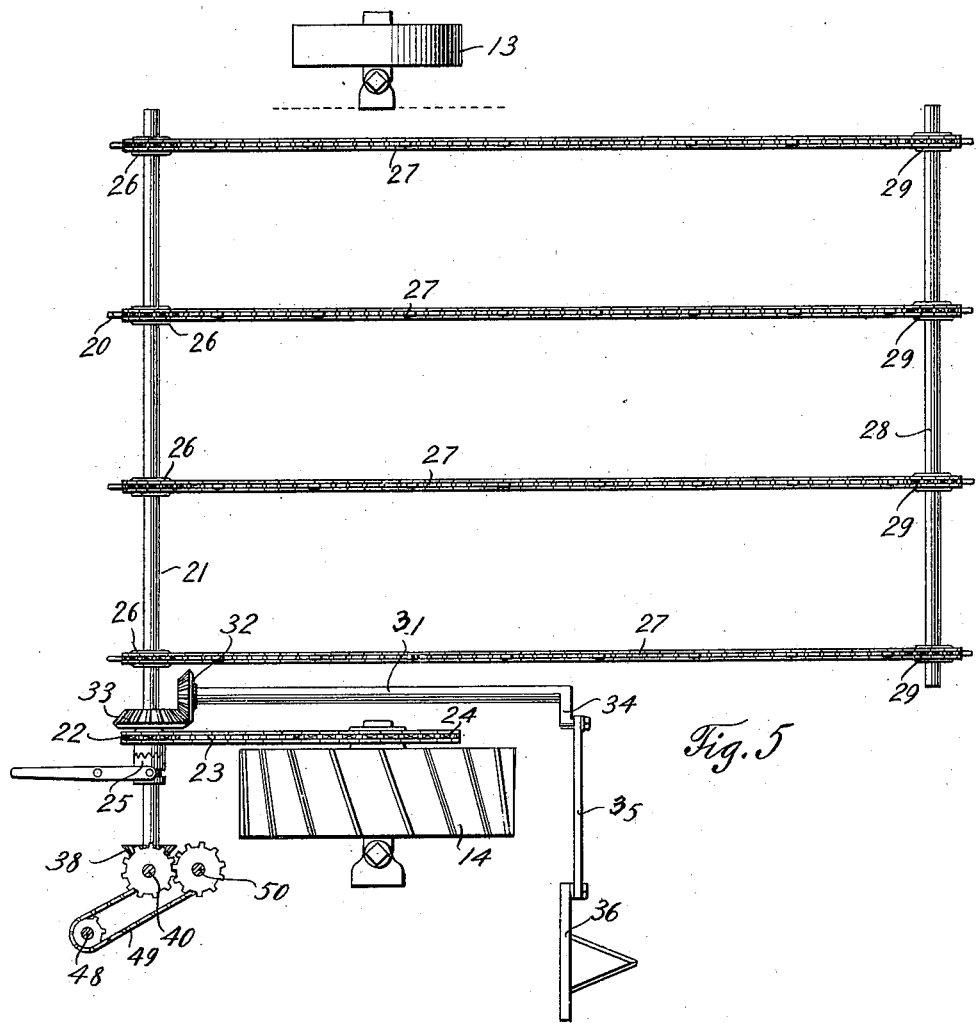

Figure 1 is a side elevation of a corn harvester embodying the present invention; Fig. 2 is a top plan view thereof; Fig. 3 is a rear elevation of the machine; Fig. 4 is a diagrammatic top plan view of the conveying mechanism; Fig. 5 is a top plan view illustrating diagrammatically the driving mechanism for the cutting elements, conveyer devices, and elevator. Fig. 6 is a transverse section taken through the cutting elements.

Referring more particularly to the drawings the present invention comprises a draft tongue 10 having at its forward terminal the hook 11 or similar member which is adapted to engage suitable means arranged on the right side of a wagon which is thereby connected to the corn harvester and which receives the stalks of corn from the same. A suitable main frame-work 12 is provided and carries on one side thereof the auxiliary frame 19 as hereinafter more fully described. This main frame 12 has mounted thereon after the manner set forth in my former patent the wheels 13 and 14, the wheel 14 having a broad tread and adapted to operate the associated mechanisms of the machine. The present invention is adapted to normally operate at an angle to the ground as is clearly set forth in Fig. 1 and is provided with a means for regulating the distance of the point from the ground comprising a lever 15 mounted on the frame 12 connected to the draft tongue 10 by a link 16. A pair of guides 17 and 18 are carried by the auxiliary frame 19, the upper sides 20 of which slope toward the front of the guides. A main shaft 21 is mounted in the frame 12 and projects through the auxiliary frame 19 and has loosely mounted thereon the sprocket wheel 22 about which operates the sprocket chain 23 which extends over a sprocket gear 24 carried by and adapted to rotate with the wheel 14. The sprocket wheel 22 is provided with a clutch member adapted to coöperate with a clutch 25 keyed to the shaft 21 and adapted to rotate therewith. From this it will be seen that the shaft 21 may be operated or not as desired. A plurality of spaced sprocket wheels 26 are mounted on the shaft 21 over which operate the carrier chains 27, said carrier chains extending to an auxiliary counter shaft 28 carrying in spaced relation a plurality of sprocket wheels 29. These chains 27 are provided with a series of lugs 30 which transport the stalks of corn after they have been cut to the wagon which is drawing the harvester.

An auxiliary shaft 31 is longitudinally mounted in the auxiliary frame 19 and has at its rear terminal the bevel gear 32 meshing with the bevel gear 33 rigidly carried by the shaft 21. The outer terminal of this shaft is provided with a crank 34 which operates a pitman 35, said pitman 35 reciprocating the movable knife 36 which coöperates with the stationary bar 37 located in the guides 17 and 18.

At the outer terminal of the shaft 21 is the bevel gear 38 which meshes with a similar bevel gear 39, operating at the lower terminal of the shaft 40 which is carried by the frame 19, said shaft thereby being rotated by the shaft 21. This shaft has adjacent to its upper terminal the sprocket wheel 41 and adjacent its lower terminal the sprocket 42. About the sprocket wheel 41 operates a chain 43 which passes around a sprocket 44 carried by the auxiliary shaft 48 which is adjacent to the forward terminals of the guides, and a similar sprocket carried by the auxiliary shaft 45, the path of said chain being substantially triangular as is set forth in Fig. 4. A similar chain 46 operates about the wheel 42 and a series of auxiliary wheels 47, the path of this chain being substantially rectangular, all of said chains being provided with a plurality of outwardly extending pegs or legs adapted to engage the stalks of the corn.

An auxiliary shaft 48 is mounted in the frame 19 to one side of the shaft 40 and is operated by a sprocket chain 49 coöperating with a sprocket wheel carried by a stub shaft 50 driven by the meshing gears 51 and 52 from the shaft 40. This shaft 48 operates an intermediate carrier chain 52 which extends from the point of the guide 18 to the shaft 48 on one side of the stalk passage. A small transverse chain 54 is also operated by the shaft 48 and in combination with the chains 43 and 46 carries the corn from the auxiliary frame to the carrier operating over the shafts 28 and 21. A curved guide 55 is provided to aid in carrying the corn from the auxiliary frame to the carrier.

Having thus described my invention, what I claim as new is:

In a corn harvester, the combination with a main frame, of an auxiliary frame carried thereby, wheels carried by said main frame a main shaft mounted in said main frame, means whereby said shaft may be driven by one of said wheels, spaced guiding members carried by said auxiliary frame, and forming a stalk passage, a horizontal shaft carried by said auxiliary frame having a beveled gear at its rear extremity, a similar beveled gear carried by said main shaft adapted to operate said horizontal shaft, a knife operable by said horizontal shaft, a vertical shaft carried by said auxiliary frame having a beveled gear at its lower terminal adapted to coöperate with the beveled gear carried by the main shaft, chains operated by said vertical shaft adjacent to the upper and lower extremities thereof, said chains adapted to operate on one side of the stalk passage formed by the guides and adapted to carry the stalks in a direction at right angles to the stalk passage, an auxiliary vertical shaft driven by said main vertical shaft, a chain adapted to operate adjacent to the opposite side of said stalk passage and extend from the point of one of said guides to said auxiliary shaft, and a transverse chain adapted to coöperate with said last named chain and carry the stalks in a direction at right angles to the stalk passage.

In testimony whereof I affix my signature in presence of two witnesses.

HENRY FRED ENGELLAND.

Witnesses:
A. A. LYKEN,
FRANK VRANEY.